United States Patent [19]

Chiu

[11] 4,104,408

[45] Aug. 1, 1978

[54] SUBSTANTIALLY NEUTRALIZED AQUEOUS LIQUID SMOKE COMPOSITIONS

[75] Inventor: Herman Shin-Gee Chiu, Chicago, Ill.

[73] Assignee: Union Carbide Corporation, New York, N.Y.

[21] Appl. No.: 783,425

[22] Filed: Mar. 31, 1977

[51] Int. Cl.$^2$ .................... A22C 13/00; A23L 1/22
[52] U.S. Cl. .................... 426/135; 426/138; 426/140; 426/314; 426/330; 426/533; 426/650
[58] Field of Search .............. 426/133, 135, 138, 140, 426/235, 277, 302, 314, 315, 533, 651, 652, 646, 330, 650

[56] References Cited

U.S. PATENT DOCUMENTS

| 3,330,669 | 7/1967 | Hollenbeck | 426/302 |
| 3,360,383 | 12/1967 | Rose et al. | 426/302 X |
| 3,427,169 | 2/1969 | Rose et al. | 426/133 |
| 3,467,527 | 9/1969 | Wistreich | 426/646 |

Primary Examiner—Robert A. Yoncoskie
Attorney, Agent, or Firm—David Fink

[57] ABSTRACT

An aqueous liquid smoke composition is provided that has a pH greater than 5 comprising a uniform mixture of smoke coloring and flavoring constituents, an alkaline neutralizing agent in an amount sufficient to maintain the composition at a pH greater than 5, and a short chain alcohol solubilizing agent in an amount sufficient to prevent said smoke constituents from separating out.

30 Claims, No Drawings

SUBSTANTIALLY NEUTRALIZED AQUEOUS LIQUID SMOKE COMPOSITIONS

The present invention relates to improved food casings and more particularly to food casings that impart "smoke" flavor and color to food products processed therein by employing novel neutralized liquid smoke solutions as a coating over the surface thereof.

Tubular food casings are used extensively for processing a great variety of meat products and other food items. The food casings are generally thin-walled tubing of various diameters prepared from reconstituted materials, and particularly cellulose derivatives such as regenerated cellulose. Food casings may also be prepared with fibrous webs embedded in the wall thereof, such casings commonly being referred to as "fibrous food casings."

The many different recipes and modes of processing that are used by the processed food industry to suit different tastes and even regional preferences generally necessitates the use of food casings with a variety of characteristics. In some instances, for example, food casings are required to have multifunctional uses wherein they serve as containers during the processing of a food product encased therein and then also serve as a protective wrapping for the finished product. In the processed meat industry, however, the food casings used in the preparation of many types of meat products, such as various types of sausages, beef rolls, hams and the like, are frequently removed from about the processed meat product prior to slicing and/or final packaging.

Surface appearance and flavor are important factors in the commercial and consumer acceptance of most processed meat products and a common feature of most varieties of such products involves the use of "smoking" for imparting characteristic flavor and color thereto. In the past, the "smoking" of food products was generally accomplished by the food processors subjecting the food product to actual contact with "smoke" in a gaseous or cloud-like form. Such "smoking" processes, however, have been considered unsatisfactory for a variety of reasons including the inefficiencies and lack of uniformity of the "smoking" operation. Because of the shortcomings experienced, the trend has been to employ various types of liquid aqueous solutions of smoke flavors commonly called "liquid smoke solutions" that have been developed and used commercially by the food processor in the processing of many types of meat and other food products.

The application of liquid smoke solutions to meat products is generally carried out in a variety of ways, including spraying or dipping an encased food product during the processing thereof or by incorporating the liquid smoke solution in the recipe itself. The actual operation of "smoking" by spraying or dipping is not completely satisfactory due to the equipment expenses and limited degree of control that has been found and incorporation of "liquid smoke solutions" in the meat recipe does not always provide the desired surface appearance because of dilution of smoke ingredients.

It has also been suggested, as for example disclosed in U.S. Pat. No. 3,330,669 to Hollenbeck, that application of a viscous liquid smoke solution to the inside surface of a tubular food casing by the food processor immediately prior to the stuffing thereof with a sausage emulsion results in preparation of processed food products that after cooking and removal of the casing exhibit good color and smoky flavor. Heretofore, however, it has been found that providing casings to afford special treatment or structural characteristics to the food product can be more uniformly and economically accomplished by the casing manufacturer. This is especially true with the advent and wide commercial use of automatic stuffing and processing equipment in the processed food industry.

Several methods of providing food casings with coatings applied to a surface thereof are known and described in the patent literature. There is disclosed, for example, in U.S. Pat. No. 3,451,827 a spraying method for applying a variety of coating materials over the internal surface of small diameter casings and in U.S. Pat. No. 3,378,379 to Shiner et al, a "slugging" method used for applying coating materials to the internal surface of large diameter casings. While such techniques and others have been used in preparing commercial quantities of a variety of coated food casings, including casings where liquid smoke is employed as a component in the coating composition, the casings produced thereby have been designed to meet particular commercial requirements and, to the best of our knowledge, none of the coated casings disclosed have been known to specifically impart "smoke" flavor and/or color to a meat product processed therein. For example, in U.S. Pat. Nos. 3,360,383 to Rose et al, and 3,383,223 and 3,617,312 to Rose there are disclosed coating compositions of various protein materials, such as gelatin, that employ liquid smoke solutions in amounts specifically required to insolubilize the protein materials. Such coated casings are disclosed as exhibiting special adhesion properties required for the processing of dry sausages, which properties would therefore limit the suitability thereof for many other casing applications.

Moreover, as is well known, commercially available liquid smoke solutions are highly acidic, generally having a pH of 2.0 to 2.5, though some commercial products are supplied in partially neutralized form with a pH of 4.5 to 5.0, and as disclosed in U.S. Pat. No. 3,467,527 to Wistreich, an oil extract of liquid smoke solution may be provided having a pH in the range between 5.5 and 8.5. The highly acidic nature of aqueous liquid smoke solutions has, heretofore, been essential to maintain all the smoke flavor and/or color constituents in solution, since neutralization to a pH greater than about 5 results in the insolubilization and separation of some of the important constituents thereof.

The problems of using highly acidic materials in conjunction with cellulosic materials have been studied over the years and the detrimental effects thereof on the cellulose polymeric structure, which generally results in a loss of strength, is well known. It has been found that such effects are also prevalent with cellulosic food casings which adds to the general undesirability of using highly acidic materials with food products. It is known, for example, that while manufacturing procedures generally employed in the preparation of food casings involves treatment with highly acidic materials, extensive washing and neutralization treatments are used to assure that the casings are in a substantially neutral condition when packaged for storage or for shipment to a food processor.

Preparation of tubular food casings that could be used in the manufacture of a variety of processed food products and would impart a desired smoke color and flavor to the processed food product would be highly desirable. Therefore, development of a liquid smoke suitable for use in the preparation of such casings would be most advantageous, particularly if it was provided in a generally neutral condition, and thereby avoids the disadvantages associated with the use of highly acidic materials with cellulosic food casings and with food products generally.

In accordance with the present invention there is provided an aqueous liquid smoke composition that is in a generally neutralized condition, having a pH greater than 5, and is suitable to impart smoke color and flavor characteristics to a cellulosic food casing and to food products processed therein comprising a uniform mixture, and preferably an aqueous solution of smoke coloring and flavoring constituents, an alkaline neutralizing agent in an amount sufficient to maintain the solution at a pH greater than 5, and an amount to be more fully described hereinafter of a short chain alcohol solubilizing agent sufficient to maintain said smoke constituents in solution. It has been discovered that the substantially neutralized aqueous liquid smoke solution of the present invention may be applied to the surface of a cellulosic food casing in an amount that will be suitable for imparting smoke flavor and color characteristics to said food casing and to a wide variety of meat products processed therein.

There is also provided in accordance with the present invention a tubular food casing that is suitable to impart smoke flavor and color to food products processed therein comprising a tubular cellulosic food casing having a coating over a surface thereof comprising an admixture of smoke coloring and flavoring constituents in an amount of at least about 0.1 mg/in$^2$, and preferably at least about 3 mg/in$^2$, of casing surface, an alkaline neutralizing agent, and a short chain alcohol solubilizing agent for said smoke constituents. It has been discovered that the tubular food casing of the present invention will not be degraded during extended periods of storage by the presence of liquid smoke constituents on the surface thereof, and, further, that such casings may be prepared in the form of shirred casing sticks, as short segments of flattened tubing, and the like.

Also provided is a method of preparing substantially neutralized aqueous liquid smoke compositions having a pH of greater than 5 that may be used in the preparation of tubular cellulosic food casings comprising neutralizing a "liquid smoke solution" with an alkaline neutralizing agent in the presence of an amount of a short chain alcohol solubilizing agent that is sufficient to maintain the smoke coloring and flavoring constituents in solution.

Smoke coloring and flavoring constituents suitable for use in accordance with the present invention are generally those designated as being the coloring and flavoring constituents of "liquid smoke" which is a well known class of materials also commonly referred to as "liquid smoke solutions." Various "liquid smokes" are known, all of which are believed suitable for use in the present invention.

Liquid smoke often is a solution of natural wood smoke constituents prepared by burning a wood, for example, a hickory or a maple, and capturing the natural smoke constituents in a liquid medium such as water. Alternatively, the liquid smoke to be used may be derived from the destructive distillation of a wood, that is, the breakdown or cracking of the wood fibers into various compounds which are distilled out of the wood residue. Liquid smokes are generally very acidic, usually having a pH of 2.5 or less and a titratable acidity of at least 3%, although some partially neutralized liquid smokes, having a pH up to about 5, are also available. Reference to the term smoke coloring and flavoring constituents, as used throughout this specification and in the appended claims with respect to the neutralized liquid smoke compositions and casings of the invention, is intended to refer to, and should be understood as referring to the smoke coloring and flavoring constituents and proportions thereof of undiluted liquid smoke solutions in their present commercially available form.

The liquid smoke that is preferred for use with this invention is a solution of natural wood smoke constituents. This liquid smoke is produced by the limited burning of hardwoods and the absorption of the smoke so generated into an aqueous solution under controlled conditions. The limited burning keeps some of the undesirable hydrocarbon compounds or tars in an insoluble form, thereby allowing removal of these constituents from the final liquid smoke. Thus, by this procedure, the desirable wood constituents are absorbed into the solution in a balanced proportion and the undesirable constituents may be removed. The resultant liquid smoke solution is representative of the whole preferred spectrum of smoke colors and flavors without a preference of any one type. The apparatus and method for manufacturing typical liquid smokes of the preferred type is more fully described in U.S. Pat. Nos. 3,106,473 to Hollenbeck and 3,873,741 to Melcer et al.

Certain liquid smokes have been approved for use in foods by the U.S. Food and Drug Administration and the Meat Inspection Division of the U.S. Department of Agriculture. Exemplary of suitable commercially available liquid smokes are CHARSOL from Red Arrow Products Co.; LIQUID HICKORY SMOKE from Hickory Specialties, Inc.; GRIFFITH'S NATURAL SMOKE FLAVOR from Griffith Laboratories, Inc.; and SMOKAROMA LIQUID SMOKE CODE 10 from Meat Industry Suppliers, Inc.

The aqueous liquid smoke composition of the present invention comprises a uniform mixture of the smoke coloring and flavoring constituents in aqueous "liquid smoke solutions" as hereinabove described, with the proportions thereof being based on "undiluted smoke solutions" in their present commercially available form; an alkaline neutralizing agent in an amount sufficient to maintain the mixture at a pH of at least 5, and preferably at a pH between 6 and 8; and a short chain alcohol solubilizing agent in an amount sufficient to prevent said smoke constituents from separating out. Preferably, the liquid smoke composition is an aqueous solution containing at least about 10% by weight of a "liquid smoke solution" (based on undiluted "liquid smoke solution" in its commercially available form).

Alkaline neutralizing agents suitable for use in accordance with the invention are any of the well known water soluble alkaline materials such as, for example, potassium hydroxide, sodium hydroxide, ammonium hydroxide, sodium carbonate, sodium bicarbonate, sodium phosphate, disodium hydrogen phosphate, trisodium phosphate, and the like. The alkaline materials may be in solid form or as a concentrated solution thereof. The most highly alkaline materials are most advantageously employed in order that the concentration of smoke constituents will be maintained as high as possible in a substantially neutralized uniform mixture thereof.

Suitable solubilizing agents are short chain monohydric and polyhydric alcohols that are water soluble, non-toxic, and preferably are approved for use in food related application. Exemplary of suitable materials are ethyl alcohol, glycerine, propylene glycol, triethylene glycol and the like.

The amount of alkaline neutralizing agent present in the uniform aqueous mixture of smoke constituents of the invention is largely determined by the acidity and composition of the particular liquid smoke solution that is to be neutralized and the particular neutralizing agent that is employed. In general, however, it has been found that at least about 6% by weight of a neutralizing agent, such as sodium hydroxide, based on the weight of "liquid smoke solution" and preferably at least about 7% by weight, will be required.

The amount of alcohol solubilizing agent that is present is also largely determined by the composition of the particular "liquid smoke solution" that is used and the desired pH of the neutralized liquid solution, but, in general, the solubilizing agent will be present in an amount of at least about 10% by weight of solution and at least about 11% by weight of the "liquid smoke solution," and preferably in an amount of at least about 15% by weight of solution and at least about 20% by weight of "liquid smoke solution." The amount of solubilizing agent that may be present in excess of that actually required may vary over a wide range, but it is generally desirable that the smoke coloring and flavoring constituents should be in as high a concentration as possible and amounts of solubilizing agent greatly in excess of that actually required would unnecessarily dilute the concentration thereof.

The substantially neutralized aqueous liquid smoke compositions of the present invention are, in general, preferably prepared by admixing a sufficient amount of alcohol solubilizing agent with a liquid smoke solution and then admixing the alkali neutralizing agent therewith until the desired pH is attained. In an alternative, but not as advantageous, procedure, the compositions of the invention may be prepared by first neutralizing the liquid smoke to the desired pH and then admixing therewith an amount of alcohol solubilizing agent sufficient to obtain a clear solution thereof.

The aqueous liquid smoke compositions of the present invention may also contain other ingredients such as, for example, viscosity control agents, coating aids, and ingredients that may be suitably used in treating an article such as a tubular food casing, to which the smoke constituents will be applied.

Substantially neutralized aqueous smoke compositions of the invention have been found to be advantageously employed as a coating material for food casings that may be used to impart smoke color and flavor characteristics to a variety of food products processed therein.

Accordingly, in accordance with the present invention, there is provided a tubular food casing having a coating over a surface thereof comprising an admixture of smoke coloring and flavoring constituents in an amount of at least about 0.1 mg/in$^2$, and preferably at least about 3 mg/in$^2$, of casing surface, an alkaline neutralizing agent, and an alcohol solubilizing agent for said smoke constituents.

Tubular food casings that are suitable for use in the casings of the present invention are tubular casings, and preferably tubular cellulosic casings, that are prepared by any one of the methods well known in the art. Such casings are generally flexible, thin-walled seamless tubing formed of regenerated cellulose, cellulose ethers and the like in a variety of diameters. Also suitable are tubular casings having a fibrous reinforcing web embedded in the wall thereof which are commonly called "fibrous food casings," and casings prepared from reconstituted materials such as collagen and the like.

Smoke coloring and flavoring constituents suitable for use in accordance with the invention are those known constituents of commercially available "liquid smokes" that afford smoke flavor and/or color characteristics to various types of food products. Various "liquid smokes," as hereinabove described, are known and all of these are believed suitable for use in the invention. The substantially neutralized aqueous liquid smoke compositions of the present invention may be advantageously employed as a source of suitable smoke coloring and flavoring constituents.

Suitable alkaline neutralizing agents and alcohol solubilizing agents are those neutralizing and solubilizing agents hereinabove described with regards to the substantially neutralized aqueous liquid smoke compositions of the present invention.

The amount of smoke constituents that should be present on the food casing of the present invention would depend on the desired flavor and/or color characteristics to be imparted to the food casing or to food products processed therein and may vary over a wide range. The amount present, therefore, is largely determined by the composition and concentration of smoke constituents in the particular "liquid smoke solution" used, and preferably the concentration of smoke constituents in the neutralized aqueous liquid smoke composition of the present invention, but, in general, the food casing should contain at least about 0.1 mg of smoke coloring and flavoring constituents per square inch of casing surface and preferably at least about 3 mg/in$^2$ of smoke constituents. The amount of alkaline neutralizing agent that should be present in the coating admixture will largely depend on the amount of smoke constituents that are present and, in general, should be present in an amount sufficient to maintain the coating admixture at a pH greater than about 5, and preferably at a pH between 6 and 8. The amount of short chain alcohol solubilizing agent that is present in the coating admixture is not critical and will also largely depend on the amount of smoke constituents that are present and the pH of the coating admixture.

Preferably, said smoke constituent coating admixture will be present primarily as a coating over the inner surface of the food casing but, if desired, the admixture may be present as a coating on the inner and outer surfaces of the casings or as a coating only on the outer surface thereof.

Other ingredients which are normally used in the manufacture of, or for further treatment of the food casings, e.g., cellulose ethers, mineral oil, etc., may also be present if desired, and they will be used in the same manner and amounts as if the smoke constituent coating admixture had not been used. Also present, are other ingredients that may, for example, be used in a substantially neutralized aqueous liquid smoke coating composition as viscosity control agents and the like, e.g. commercial sugars or sugar substitutes, etc.

Food casings of the present invention may be prepared by application of a substantially neutralized, aqueous liquid smoke compositions of the present invention to a surface of suitable tubular food casings by using any one of a number of well known methods. Thus, for example, a neutralized aqueous liquid smoke solution can be introduced into the tubular casing in the form of a "slug" of liquid, in a manner similar to that disclosed, for example, in U.S. Pat. No. 3,378,379 to Shiner et al, and advancing the casing past the liquid slug coats the inner surface thereof. Alternatively, the neutralized aqueous liquid smoke solution may be applied to the internal surface of the casing through a hollow mandrel over which the casing is advancing as, for example, a shirring machine mandrel in a manner similar to that described in U.S. Pat. No. 3,451,827 to Bridgeford. The liquid smoke solution may also be applied to a casing surface by well known dip or spray coating methods. If desired, a liquid smoke solution may be applied to one surface of the casing, such as the outside surface thereof, and the casing can then be turned inside-out, to provide thereby a casing having a coating on the inside surface.

Food casings of the present invention may be provided in any of the forms known in the art, such as in the form of shirred casing sticks, discrete short segments of flattened casings, continuous lengths of flattened casing on a reel, and the like. It has been found that such casings may be stored for extended periods of time without being structurally degraded, and when employed in the processing of a wide variety of food products will impart smoke flavor and/or color to the food product without the need for other well known smoking procedures.

The invention will become more clear when considered together with the following examples which are set forth as being merely illustrative of the invention and which are not intended, in any manner, to be limitative thereof. Unless otherwise indicated, all parts and percentages are by weight.

EXAMPLE I

A series of liquid smoke compositions were prepared from a variety of commercially available "liquid smokes" using the following proportion of ingredients:

| Ingredients | Composition (gms.) | | | | | | | | | |
|---|---|---|---|---|---|---|---|---|---|---|
| | A | B | C | D | E | F | G | H | I | J | K |
| Liquid Smoke A | 25 | 25 | 25 | 25 | — | — | — | — | — | — | — |
| Liquid Smoke B | — | — | — | — | 25 | 25 | 25 | 25 | — | — | — |
| Liquid Smoke C | — | — | — | — | — | — | — | — | 25 | 25 | 25 |
| Solid NaOH | — | 1.3 | 1.3 | 1.9 | — | 0.8 | 0.8 | 2.0 | — | 2.5 | 3.0 |
| Propylene Glycol | — | — | 2.8 | 8 | — | — | 2.5 | 5 | — | 5 | 7 |

Liquid Smoke A was purchased under the tradename SMOKAROMA Pure Liquid Hickory Smoke, Code 10 from Meat Industry Suppliers, Inc. Liquid Smoke B was purchased under the tradename CHARSOL C-10 from Red Arrow Products Co. Liquid Smoke C was purchased under the tradename LIQUID SMOKE FLAVORING, 18% from Mallinchrodt Chemical Works.

The pH and appearance of each of the liquid smoke compositions of this example are reported in Table 1.

TABLE 1

| Composition | pH | Composition Appearance |
|---|---|---|
| A | 2.2 | clear |
| B | 4.9 | "tarry" precipitate |
| C | 5.0 | clear |
| D | 6.5 | clear |
| E | 2.2 | clear |
| F | 4.4 | "tar" separation |

TABLE 1-continued

| Composition | pH | Composition Appearance |
|---|---|---|
| G | 4.4 | clear |
| H | 6.4 | clear |
| I | 2.2 | clear |
| J | 5.8 | clear |
| K | 6.9 | clear |

The results reported in Table 1 show the importance of using an alcohol solubilizing agent in preparing liquid smoke compositions having a pH greater than 5.

EXAMPLE II

Several liquid smoke compositions were prepared using the following proportion of ingredients:

| Ingredients | Composition (gms.) | | | | |
|---|---|---|---|---|---|
| | A | B | C | D | E |
| Liquid Smoke | 25 | 25 | 25 | 25 | 25 |
| Solid NaOH | — | 1.5 | 1.8 | 1.8 | 1.9 |
| Glycerine | — | — | 15 | — | — |
| Triethylene Glycol | — | — | — | 8 | — |
| Ethyl Alcohol | — | — | — | — | 8 |

The "liquid smoke" used in the example was the same commercial material as Liquid Smoke A of Example I.

Reported in Table 2 are the pH values and solution appearance of each of the compositions of this example.

TABLE 2

| Composition | pH | Composition Appearance |
|---|---|---|
| A | 2.2 | clear |
| B | 5.5 | "tarry" precipitate |
| C | 6.5 | clear |
| D | 6.4 | clear |
| E | 7.0 | clear |

EXAMPLE III

Flattened, commercially produced tubular cellulosic casings having a flat width measuring about 1.3 inches (3.3 cm) are used to prepare the casing samples of this example.

Segments of the casing about three feet long are "slug" treated with the liquid smoke compositions described below, inflated with air and tied off at the ends. The treated casing samples are drained and dried by hanging overnight at room temperature.

Liquid smoke compositions having the following proportion of ingredients are used in preparing the coated casing samples of this example.

| | Compositon (Parts By Weight) | |
|---|---|---|
| | A | B |
| Liquid Smoke | 100 | 60 |
| Propylene Glycol | — | 40 |
| Conc. NH$_4$OH | — | 14 |
| pH | 2.2 | 7 |

The "liquid smoke" used is SMOKAROMA CODE 10, a product of Meat Industry Suppliers, Inc.

The coated casing samples along with an uncoated casing sample are evaluated by the Cupriethylene Diamine Disperse (C.E.D) Viscosity procedure (TAPPI, December 1946, T230 SM-46) after various periods of storage. The C.E.D. viscosity values are related to the cellulose chain structure, and therefore serve as an indication of degradation of the cellulose casing material.

Coated casing samples are also subjected to an accelerated aging test in a laboratory oven. A summary of results obtained during the storage and aging tests are reported in Table 3.

TABLE 3

| Casing Sample | Coating | Coating Wt. (% of Casing Wt.) | C.E.D. Viscosity After 1 Week | C.E.D. Viscosity After 3 Weeks | Oven Aging |
|---|---|---|---|---|---|
| A | — | — | 5.26 | 4.84 | |
| B | A | 14.6 | 4.96 | 4.50 | |
| C | A | 26.2 | 5.00 | 4.29 | (a) |
| D | B | 17.7 | 5.11 | 4.95 | (b) |

(a) after aging in an oven at 90° C for 5 minutes, the sample is very brittle
(b) after aging in an oven at 90° C for 5 minutes, no sign of degradation is observed Casing sample A, which is used as a control for comparison purposes, exhibits some change in C.E.D. viscosity after aging 3 weeks, but casing sample D, which is coated with a neutralized liquid smoke composition, shows relatively little change in C.E.D. viscosity after aging 3 weeks and no observable change after being aged at 90° C. Casing sample B exhibits a somewhat greater change in C.E.D. viscosity than either of casing samples A and D, and casing sample C exhibits an even greater change in C.E.D. viscosity as well as undergoing substantially total degradation after aging for 5 minutes at 90° C.

EXAMPLE IV

A liquid smoke coating composition is prepared having the following proportion of ingredients:

| Liquid Smoke | 1000 gms |
| Propylene Glycol | 250 gms |
| Sodium Hydroxide Pellets | 70 gms |

The "liquid smoke" used in this example is SMOKAROMA, CODE 10 obtained from Meat Industry Suppliers, Inc. The liquid smoke has a pH of 2.4 and the pH of the neutralized smoke compositions is 6.2.

A commercially prepared tubular cellulose food casing having a flat width of about 1.3 inches (3.3 cm) is used to prepare the casing samples of this example. Short segments of the cellulose casing, in flattened condition, are "slug" treated with the coating composition of this example and are then inflated with air with the ends of the casing tied off. Excess coating is drained from the casing surface and the casing samples are dried by hanging the inflated casing from one end for about 2 hours in air.

The dried, coated casing samples are hand shirred on a laboratory stuffing apparatus and then stuffed and linked with a frankfurter type meat emulsion. A length of the tubular casing without a liquid smoke coating is also stuffed and linked as a control. The stuffed casing samples are processed with hot air using a conventional procedure.

Upon removal of the casings, the processed food prepared in the casings coated with the liquid smoke composition of this example exhibit a characteristic "smoke" flavor and color while the products prepared in the uncoated control casings do not exhibit any detectable "smoke" color or flavor.

EXAMPLE V

A liquid smoke composition is prepared having the following proportion of ingredients:

| Liquid Smoke | 10 parts by weight |
| Propylene Glycol | 50 parts by weight |
| Water | 40 parts by weight |

The composition is neutralized with concentrated ammonium hydroxide to a pH of 8.

The liquid smoke used is FIRMENICH SMOKE FLAVORING 51.676/TR available from Firmenich Co., New York, N.Y.

The liquid smoke composition is applied to the internal surface of a commercially prepared tubular cellulosic food casing having a flat width of about 1.4 inches using shirring apparatus such as disclosed in U.S. Pat. No. 3,110,058 to Marbach and the method of coating disclosed in U.S. Pat. No. 3,451,827. The rate of application of the coating composition is about 3.5 mg/in$^2$ of casing surface and several 84 foot lengths of the shirred coated casing are prepared.

Shirred samples of the coated casing are stuffed with a frankfurter type meat emulsion using a conventional frankfurter stuffing and linking apparatus and then processed using a conventional frankfurter processing cycle but without any further "smoking." Uncoated casing is similarly stuffed and processed as a control. Frankfurters prepared with the coated casing samples of this example exhibit characteristic "smoke" color and flavor whereas frankfurters prepared in the uncoated casing exhibit no detectable smoked characteristics.

What is claimed is:

1. An aqueous liquid smoke composition having a pH greater than 5, comprising a uniform mixture of smoke coloring and flavoring constituents, an alkaline neutralizing agent in an amount sufficient to maintain said composition at a pH greater than 5, and an amount of a water soluble alcohol solubilizing agent sufficient to prevent said smoke constituents from separating out.

2. The liquid smoke composition as claimed in claim 1, wherein said smoke coloring and flavoring constituents comprise components derived from a liquid smoke solution.

3. The liquid smoke composition as claimed in claim 2, wherein said neutralizing agent is present in an amount of at least about 6% by weight based on the weight of said liquid smoke solution.

4. The liquid smoke composition as claimed in claim 2, wherein said alcohol solubilizing agent is present in an amount of at least about 10% by weight of the composition and at least about 11% by weight of liquid smoke solution.

5. The liquid smoke composition as claimed in claim 1, wherein said composition is an aqueous solution.

6. The liquid smoke composition as claimed in claim 1, wherein said composition has a pH between about 6 and 8.

7. A method of preparing a substantially neutralized aqueous smoke composition having a pH greater than 5 comprising neutralizing a liquid smoke solution, comprising smoke coloring and flavoring constituents with an alkaline neutralizing agent in the presence of an amount of a water soluble alcohol solubilizing agent that is sufficient to maintain the smoke constituents of said liquid smoke solution in solution.

8. The method of preparing an aqueous smoke composition as claimed in claim 7, wherein said neutralizing agent is added in an amount of at least about 6% by weight based on the weight of liquid smoke solution.

9. The method of preparing an aqueous smoke composition as claimed in claim 7, wherein the amount of alcohol solubilizing agent that is used is at least about 10% by weight of the composition and at least about 11% by weight of the liquid smoke solution.

10. The method of preparing an aqueous smoke composition as claimed in claim 7, wherein said neutralizing agent is added in an amount sufficient to maintain the pH of said composition between about 6 and 8.

11. A tubular food casing that is suitable to impart smoke color and flavor to food products processed therein, comprising a tubular food casing having a coating over a surface thereof comprising an admixture of smoke coloring and flavoring constituents in an amount of at least about 0.1 mg per square inch of casing surface, an alkaline neutralizing agent in an amount sufficient to keep the coating admixture at a pH greater than 5, and a water soluble alcohol solubilizing agent for said smoke constituents.

12. The tubular casing as claimed in claim 11, wherein said tubular casing is a tubular cellulosic casing.

13. The tubular casing as claimed in claim 11, wherein said smoke constituents are present in said admixture in an amount of at least about 3 mg. per square inch of casing surface.

14. The tubular casing as claimed in claim 11, wherein said coating admixture has a pH between about 6 and 8.

15. The tubular casing as claimed in claim 11, wherein said tubular casing is a tubular collagen casing.

16. The liquid smoke composition as claimed in claim 1, wherein said alcohol solubilizing agent is selected from the group consisting of ethyl alcohol, glycerine, propylene glycol, and triethylene glycol.

17. The liquid smoke composition as claimed in claim 1, wherein said alcohol solubilizing agent comprises propylene glycol.

18. The liquid smoke composition as claimed in claim 1; wherein said neutralizing agent is selected from the group consisting of potassium hydroxide, sodium hydroxide, ammonium hydroxide, sodium carbonate, sodium bicarbonate, sodium phosphate, disodium hydrogen phosphate, and trisodium phosphate.

19. The liquid smoke composition as claimed in claim 1, wherein said neutralizing agent comprises sodium hydroxide.

20. The liquid smoke composition as claimed in claim 19, wherein said smoke coloring and flavoring constituents are components of a liquid smoke solution and said sodium hydroxide amounts to at least about 6% by weight of said liquid smoke solution.

21. The method as claimed in claim 7, wherein said alcohol solubilizing agent is selected from the group consisting of ethyl alcohol, glycerine, propylene glycol, and triethylene glycol.

22. The method as claimed in claim 7, wherein said alcohol solubilizing agent comprises propylene glycol.

23. The method as claimed in claim 7, wherein said neutralizing agent is selected from the group consisting of potassium hydroxide, sodium hydroxide, ammonium hydroxide, sodium carbonate, sodium bicarbonate, sodium phosphate, disodium hydrogen phosphate, and trisodium phosphate.

24. The method as claimed in claim 7, wherein said neutralizing agent comprises sodium hydroxide.

25. The method as claimed in claim 24, wherein said smoke coloring and flavoring constituents are components of a liquid smoke solution and said sodium hydroxide amounts to at least about 6% by weight of said liquid smoke solution.

26. The food casing as claimed in claim 11, wherein said alcohol solubilizing agent is selected from the group consisting of ethyl alcohol, glycerine, propylene glycol, and triethylene glycol.

27. The food casing as claimed in claim 11, wherein said alcohol solubilizing agent comprises propylene glycol.

28. The food casing as claimed in claim 11; wherein said neutralizing agent is selected from the group consisting of potassium hydroxide, sodium hydroxide, ammonium hydroxide, sodium carbonate, sodium bicarbonate, sodium phosphate, disodium hydrogen phosphate, and trisodium phosphate.

29. The food casing as claimed in claim 11, wherein said neutralizing agent comprises sodium hydroxide.

30. The food casing as claimed in claim 29, wherein said smoke coloring and flavoring constituents are components of a liquid smoke solution and said sodium hydroxide amounts to at least about 6% by weight of said liquid smoke solution.

* * * * *